April 29, 1952  C. E. ERICKSON  2,595,191
ARTIFICIAL LURE
Filed April 19, 1949  2 SHEETS—SHEET 1
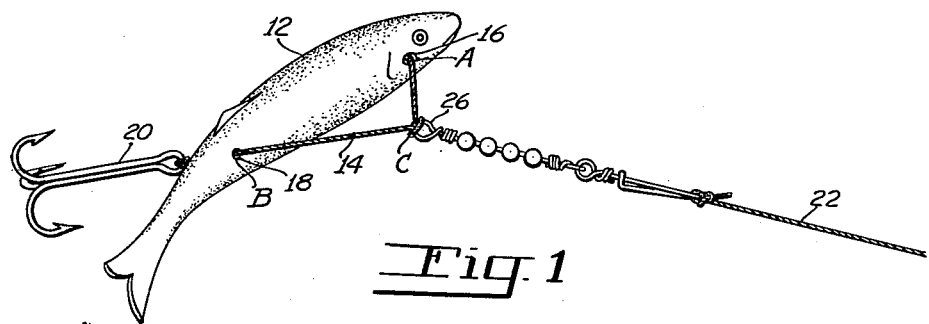
Fig. 1
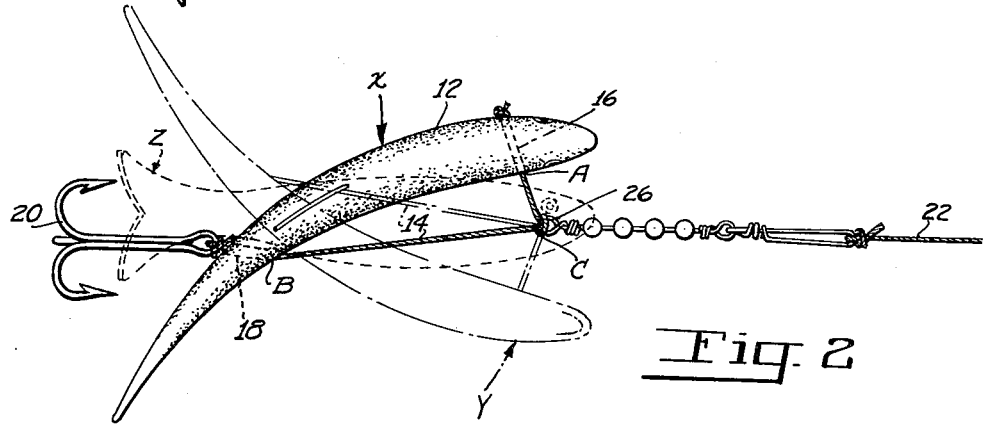
Fig. 2
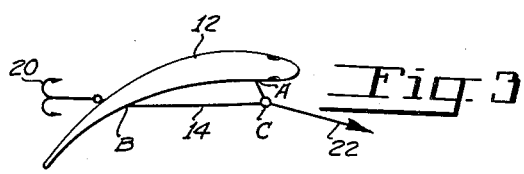
Fig. 3
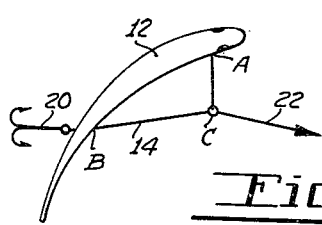
Fig. 4
Fig. 10
INVENTOR.
CHARLES E. ERICKSON
BY
Reynolds Beach
ATTORNEYS

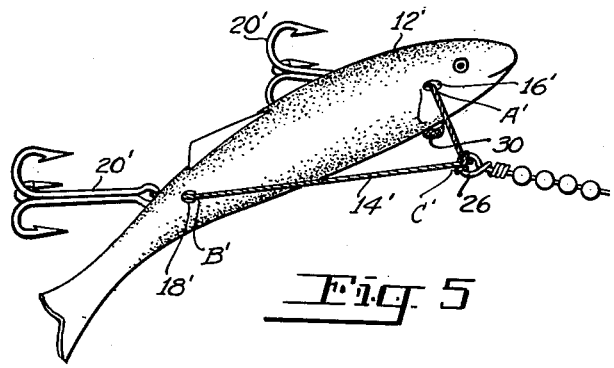
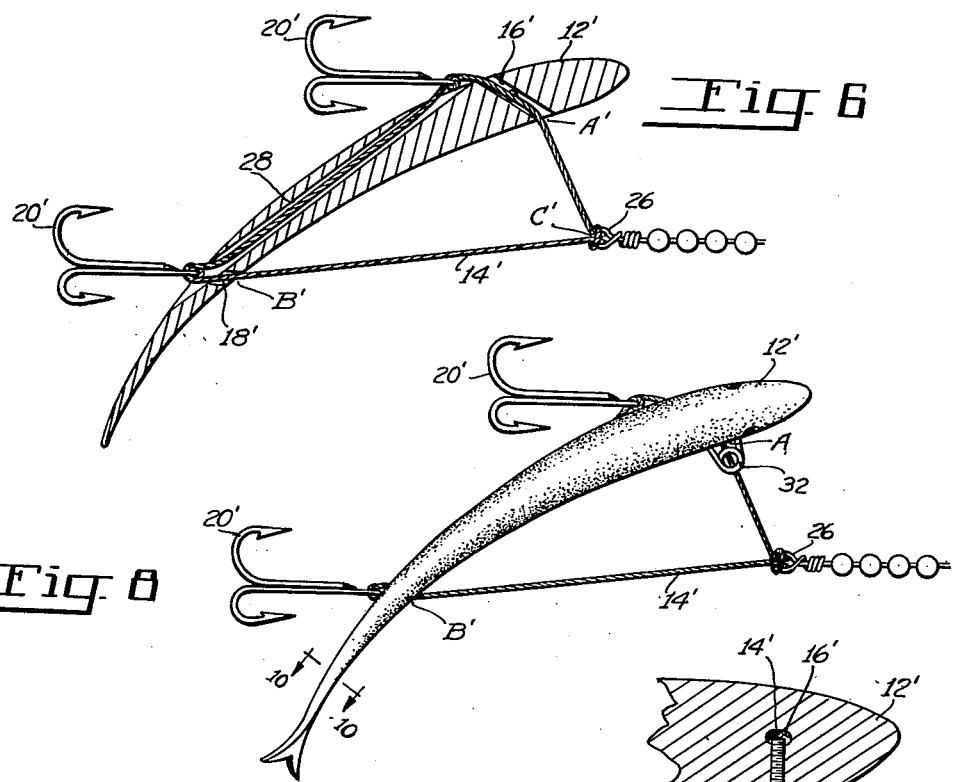

Patented Apr. 29, 1952

2,595,191

UNITED STATES PATENT OFFICE 2,595,191

ARTIFICIAL LURE

Charles E. Erickson, Seattle, Wash., assignor to Tradewinds, Inc., Tacoma, Wash., a corporation of Washington Application April 19, 1949, Serial No. 88,275

6 Claims. (Cl. 43—42.36)

This invention relates to artificial lures for fishing, and more particularly to those of the type useful in trolling or bait casting for game fish, such as salmon, salmon-trout, and trout varieties. Its principal object is the traditional one of enabling the fisherman to catch more and bigger fish.

One well known action-type lure is the "plug." The fishing "plug" is usually of blunt-nosed, generally cylindrical form, which in the water executes an erratic side to side darting action. Still another well known action-type lure is the "spoon," generally made of a flat, shiny metal strip. The strip is bent to form curved or angulated surfaces which give it an oscillating side to side swinging motion when drawn through the water. It is to be noted that both of these lure types rely for their attracting action upon the hydrodynamic effect resulting from the use of unnatural or distorted lure shapes which differ substantially, although in varying degrees with different lures, from the natural shape of the bait fish sought to be imitated. This, I believe, is a limitation upon their potential effectiveness in catching fish.

Accordingly an important object of my present invention is to devise an artificial lure which obtains its attracting action in the water without necessity of resorting to an unnatural bait fish form. A related object is to devise an artificial lure which may, as near as can be, accurately simulate the form and appearance of a natural bait fish, and which is then so adapted and rigged as to possess an effective attracting action. Preferably the action obtained resembles that of a crippled bait fish or one desperately attempting escape from an enemy.

An important feature of the invention lies in the combination of a simulated bait fish which is bowed transversely of its length and in a plane generally normal to its body plane, said bait fish being rigged to provide an appreciably offset fishline connecting point on its inbowed side. Preferably the hook used with the lure is secured thereto from the outbowed side near its tail, although the location and number of hooks used may vary with different forms of my invention.

A more specific feature resides in the use of a rigging line separate from the fishline, such rigging line being connected between points on the inbowed side of the simulated bait fish, spaced apart lengthwise thereof. Results are best if such spacing is at least a substantial fraction of the lure's length, and the forward connecting point is located near its nose end. The fishline is then secured to the slack rigging line at a point intermediate its ends. When the lure is drawn through the water by the fishline the rigging line then becomes taut, so that said intermediate securing point becomes spaced laterally from the lure body by an appreciable distance. The location of such securing point establishes, at a given speed of travel through the water, the rate of spin of the lure. In an alternative form, special rigging line adjustment means are provided, to enable conveniently shifting the effective location of the fishline securing point, and thereby obtain different actions.

These and other objects, features, and advantages of the invention will become further evident from the following description of its several forms illustrated in the accompanying drawings.

Figure 1 is a perspective view of one form of my improved artificial lure, shown connected to a fishline.

Figure 2 is a top view of the same, showing also by broken lines different rotated positions of the lure executing its characteristic wobble or spin.

Figures 3 and 4 are simplified top views of the same form, illustrating the effect on the angle of disposition of the lure body with relation to the fishline, obtained by shifting of the fishline offset securing point to different locations along the rigging line.

Figure 5 is a perspective view of a modified form of the invention.

Figure 6 is a longitudinal sectional view taken through the horizontal mid-plane of the modified form.

Figure 7 is a longitudinal sectional view taken through the vertical mid-plane of the nose end portion only, of the modified form, showing a clamping device for an adjustable rigging line.

Figure 8 is a top view of a variation of the modified form shown in Figures 5 to 7.

Figure 9 is a fragmentary side view of the nose end portion of the variation, showing an alternative clamping device for an adjustable rigging line.

Figure 10 is a transverse sectional view at a somewhat enlarged scale, taken on line 10—10 of Figure 8.

Referring first to the form illustrated in Figures 1 and 2, the artificial lure comprises a simulated bait fish 12 made of some suitable material such as thermosetting plastic, wood, or a light metal. The simulated bait fish may resemble, as nearly as can be, the natural shape and size, and even the natural coloring of its living counterpart. In fishing for Pacific salmon and salmon-trout varieties a simulated herring form is very effective. Generally speaking, I believe, incidentally, that the most effective lure action is obtainable from a bait fish form, such as the herring, having fairly broad and flat sides in comparison to its thickness, and is preferable to one which is more round or cylindrical, such as the candle fish. However, the essential features of the invention are not to be understood as limited to any one particular bait fish form. Likewise the size of the lure may vary. A selection of different sizes to suit particular species of game fish, to be caught on different occasions, is in fact desirable.

As an important feature of the invention the body of the simulated bait fish 12 has a permanent curvature. Preferably it is gradually bowed or arched transversely of its length and in a plane normal to its general body plane. The abruptness and amount of curvature are not critical, and may be varied according to the particular lure action desired.

In addition the lure includes offset securing means for a fishline. Such means preferably comprises a rigging line 14 secured to the simulated bait fish between points A and B, spaced apart lengthwise thereof on its inbowed side, the forward point A being located in the vicinity of the head portion, and the tailward point B being located preferably between its mid-portion and tail, as shown.

In Figure 2 the forward end of rigging line 14 passes through a transverse bore 16 extending through the sides of the bait fish's head portion, and its projecting end on the convex side thereof is knotted or otherwise provided with an enlargement or secured to prevent its withdrawl back through the bore. The other end of the rigging line passes through a rearwardly located transverse bore 18, extending through the bait fish, and is secured at the outbowed side thereof to the eye of a hook 20, which is too large to pass through bore 18. In effect, therefore, bores 16 and 18 constitute effective connecting means or points A and B, respectively.

It is to be observed that the hook, when so connected, is permitted to drag from the simulated bait fish along its convex side and near its tail. This location I find to be particularly effective for catching salmon, and one interesting point about it is that in this location the hook occupies a comparatively constant or average position relative to the spinning lure, near the axis of spin, so that as the lure wobbles the hook does not swing as widely as it might were it to be connected to a point further removed from the axis of spin. When the salmon strikes at the lure it is therefore more likely that the hook will be taken in its mouth, and not be missed.

The rigging line 14 normally extends loosely between connecting points A and B, so that when the fishline is secured thereto at an intermediate location C, and the rigging line is drawn taut, the fishline securing point will then be appreciably offset laterally from the side of the bait fish. The latter will assume a definite general body angle in relation to the fishline. In order to secure fishline 22 to the rigging line in this manner it is conveniently provided with a common bead and link chain type swivel connector having an eye 26 through which rigging line 14 may be looped and knotted. The knot can be loosened to shift the position of the eye along the rigging line, as desired. The swivel connector allows the lure to spin without twisting the fishline.

The angle assumed by the simulated bait fish in relation to the fishline will depend upon the total and relative lengths of rigging line between securing point C and connecting points A and B, and the spacing between points A and B. If this angle is great, although in practice it will never be made nearly as large as 90°, the rate of spin of lure 12 will be comparatively slower than if the angle is small. In Figure 3 the connection is made for a small angle and rapid spin, while in Figure 4 a larger angle is shown. If the angle is made too small the lure will not act properly or execute an effective regular action in the water.

As a general observation, when the rigging line connections are made as described, the axis of fishline 22 will intersect the body plane of bait fish 12 at a point generally midway between its ends, although the particular point of intersection is not critical.

In Figure 2 the lure is shown in several positions of its rotation about the axis of fishline 12, X, Y and Z. Any unbalance of the lure with respect to the normal plane containing the taut rigging line will produce spinning. The natural shape of the simulated bait fish itself is usually sufficiently unsymmetrical in this respect that connecting points A and B need not be offset from the horizontal midplane of the lure to produce unbalance and spinning. Because of its body curvature, as the angularly disposed lure spins, its tail end swings through a larger radius than does its nose. This produces a wobble which seems to be highly effective in catching fish.

If the air is cold, it may not be convenient to shift the effective position of fishline securing point C along rigging line 14, to obtain a different lure action, by tying and untying knots or loosening the knot engaging the connector eye 26 to slide it along rigging line 14 to a new position. For this and other reasons I have devised alternative arrangements for adjusting the fishline securing point with relation to the lure. Two such alternatives are hereinafter described.

In Figures 5, 6, and 7 the modified form illustrated has a rigging line 14' in the form of a continuous loop which passes through bores 16' and 18' corresponding to bores 16 and 18 in Figure 1, and through a longitudinal straight bore 28 extending between the openings of bores 16' and 18' on the convex side of the lure 12'. At the respective intersections of these bores the exposed rigging line is looped through the eyes of separate fishhooks 20', securing them in place. The forwardmost hook 20' cannot foul on the rigging line, since it is shielded within bore 28. In this form of lure the fishline may be secured permanently to a point on rigging line 14', since the effective position of such point may be shifted to change the angle of the lure with relation to the fishline by sliding the rigging line loop endwise through its retaining bores. When the desired loop position is attained, the rigging line is restrained against further sliding by clamp means in the form of set screws 30 threaded in the body of the bait fish to enter one of the bores 16' or 18' and clamp the rigging line to the side of such bore. As shown in Figure 7, the set screw enters bore 16' in the head portion of the lure.

In the variation shown in Figures 8 and 9 a different clamping arrangement for the rigging line is illustrated. Here such line is normally clamped between sides or turns of a coil of wire, formed as an eyelet 32, having straight legs or sides which are embedded in the side of the lure's body. In the illustrated case the eyelet is located across the entrance of bore 16', although it may be located at any position on the lure body at which it may clamp and hold the rigging line against sliding through its bores. In order to release the line from the hold of eyelet 32 it is simply slid circumferentially of the eyelet coil in either direction until it is free to be slid through the corner angle between one side of the coil and one of the supporting legs of the eyelet. When the rigging line is adjusted to the proper position it is again pinched between the eyelet coil sides by forcing the line circumferentially therebetween.

An incidental feature of the alternative form shown in Figure 8 is the opposite curvature given the respective tail blades of the simulated bait fish, one blade being curved laterally toward the convex side, and the other blade laterally toward the concave side. The purpose of this is to augment the spinning tendency of the bait fish by creating further unbalance.

I claim as my invention:

1. The artificial lure comprising a simulated bait fish bowed transversely of its length in a plane substantially normal to its general body plane, said bait fish having two transverse bores through its sides at locations spaced apart lengthwise thereof, one of said bores being located generally in its head portion and one generally between its mid-portion and tail, and a generally longitudinal straight bore extending generally chordwise through the bowed body thereof generally between the ends of the two transverse bores at the outbowed side of the bait fish, a rigging line passed continuously through all three of said bores, and separate hooks slidably secured to said rigging line at the respective ends of the straight bore, the rgging line providing fish-line offset connecting means for the simulated bait fish at its inbowed side.

2. An artificial lure comprising a simulated bait fish bowed transversely of its length, a rigging line, means securing one portion of said rigging line to said simulated bait fish to extend outwardly from its inbowed side at a point thereon in the vicinity of the head portion thereof, and means securing another portion of said rigging line to said simulated bait fish to extend outwardly from its inbowed side at a point spaced appreciably tailward thereof from said first point, said rigging line having a slack portion extending between said two points on the inbowed side of said simulated bait fish, and said rigging line being adapted for connection of a fishing line thereto at a generally intermediate location thereon forward of its midpoint to dispose said simulated bait fish at an angle to the fishing line, said bowed curvature and rigging line connections causing said simulated bait fish to wobble and simulate a crippled natural bait fish as such simulated bait fish is drawn through the water by the fishing line so connected.

3. An artificial lure comprising a simulated bait fish bowed transversely of its length, a rigging line, means securing one portion of said rigging line to said simulated bait fish to extend outwardly from its inbowed side at a point in the vicinity of the head portion thereof, said simulated bait fish having a transverse aperture located appreciably tailward from said first point, said outwardly extending rigging line passing through said aperture, and hook means secured to the rigging line on the outbowed side of the simulated bait fish, said rigging line extending normally slackly between said first point and said aperture and being adapted for connection of a fishing line to a generally intermediate location thereof forward of its midpoint to dispose said simulated bait fish at an angle to the fishing line for trolling of the lure through the water with a wobble action resembling the movement of a crippled natural bait fish.

4. The artificial lure defined in claim 3, wherein the simulated bait fish has a transverse aperture at the first named point thereon and through which the corresponding portion of the rigging line extends, and means preventing withdrawal of such rigging line back through said aperture and thereby comprising the rigging line securing means.

5. A lure comprising a body having greater length than width, said body being longitudinally bowed and having transverse bores through the body adjacent the opposite ends thereof, said body having a longitudinally extending bore connecting said transverse bores, a continuous rigging line passing through all of said bores and having a slack portion thereof extending away from the concave side of said body and forwardly of its mid-point, hook means connected to said line on the convex side of said body adjacent at least one of said transverse bores, and a fishing line connected to the slack portion of said rigging line at the concave side of said body and forwardly of its mid-point:

6. The artificial lure defined in claim 5, wherein the rigging line is slidable in the bores, and clamp means on the simulated bait fish releasably engageable with the rigging line loop for restraining the same normally against sliding through the bores, release of the rigging line from said clamp means permitting sliding of such loop through such bores and thereby permitting effective adjustment of the fishing line connecting point lengthwise of the slack portion of the rigging line to modify the lure action.

CHARLES E. ERICKSON.

REFERENCES CITED

The following references are of record in the file of this patent:

UNITED STATES PATENTS

| Number | Name | Date |
| --- | --- | --- |
| 552,012 | Stanley | Dec. 24, 1895 |
| 1,490,161 | Dickman | Apr. 15, 1924 |
| 1,543,206 | Doering | June 23, 1925 |

FOREIGN PATENTS

| Number | Country | Date |
| --- | --- | --- |
| 175,719 | Great Britain | Feb. 15, 1922 |
| 64,325 | Norway | Oct. 18, 1922 |